Jan. 21, 1969     E. J. GRICHNIK     3,422,609
COTTON PICKER
Filed Oct. 25, 1966
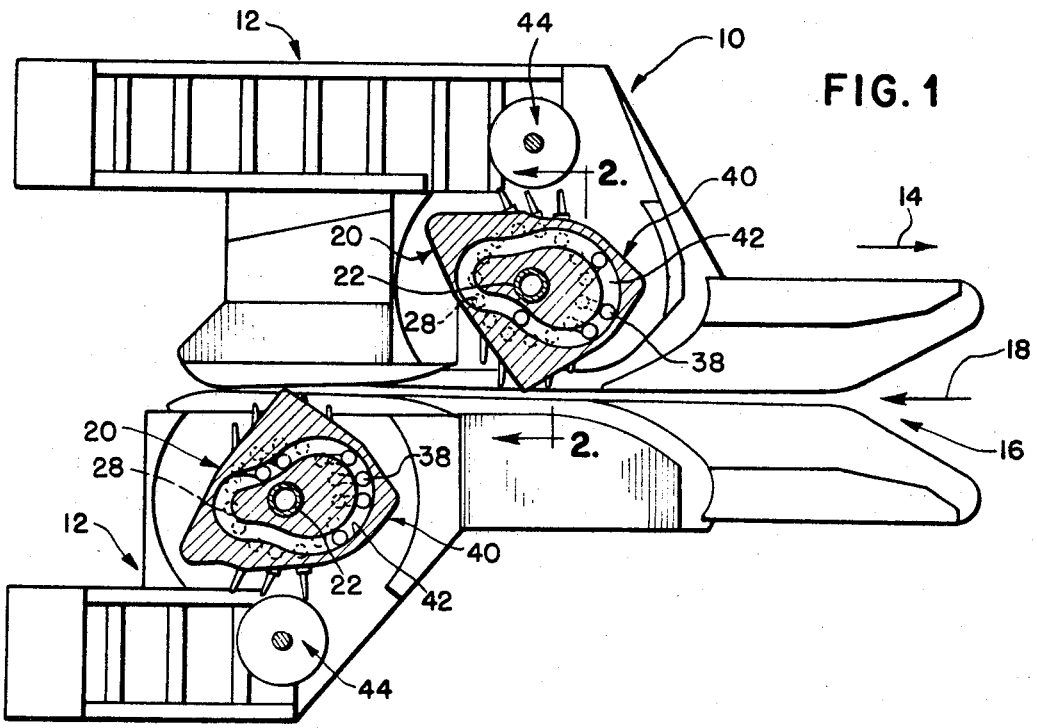
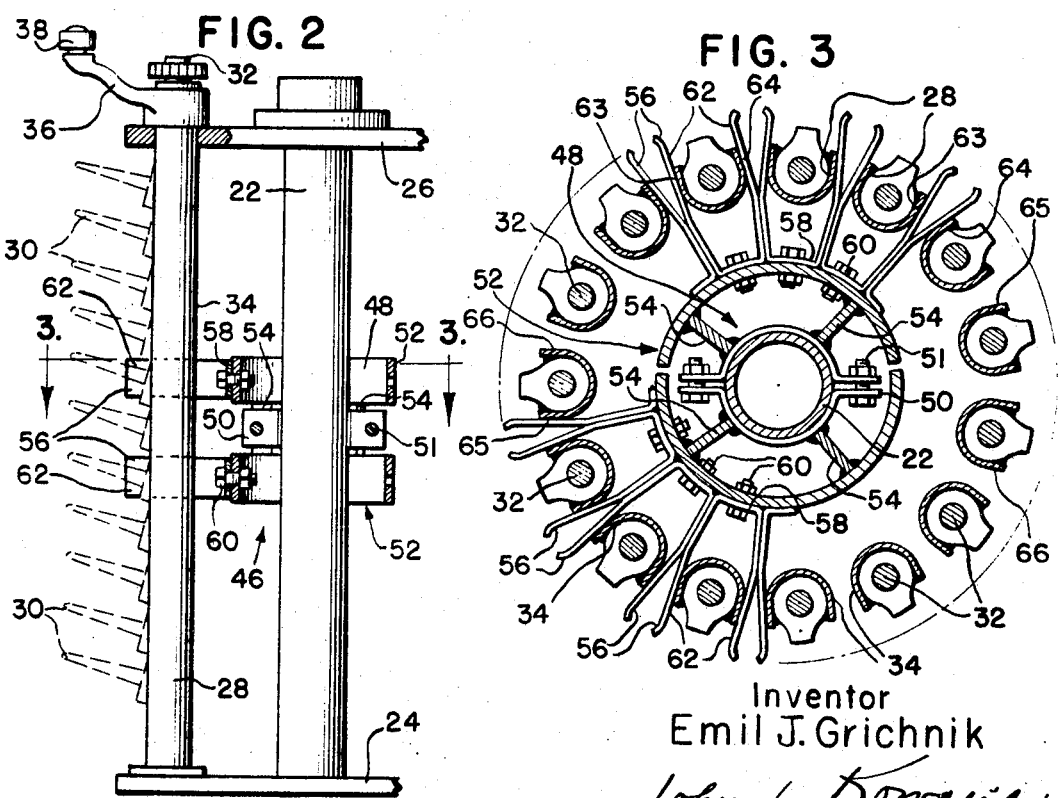
Inventor
Emil J. Grichnik
John J. Kowalik
Attorney

United States Patent Office 3,422,609
Patented Jan. 21, 1969

3,422,609
COTTON PICKER
Emil J. Grichnik, 903 N. McNeil St.,
Memphis, Tenn. 38107
Filed Oct. 25, 1966, Ser. No. 589,439
U.S. Cl. 56—47  7 Claims
Int. Cl. A01d 45/18

The present invention relates to a cotton picker.

The invention relates more particularly to means for controlling the action of the picker bars in a cotton picker.

Cotton pickers of the most common type include picking units having drums including a plurality of vertical picker bars with horizontal spindles which reach into the cotton plants passing through the passage adjacent which the drums are located. The picker bars are carried around the periphery of the drum in the rotation of the drum and are controlled by cam arms having cam followers riding in cam slots in a fixed portion of the implement. The contour of the cam slot causes these bars to whip around their orbit which promotes rapid wear in the cam arms and slots, or the picker bars and their mountings, or both, and the resulting whipping of the picker bars leads to breaking thereof.

An object therefore of the invention is to provide novel means for modulating such whipping action of the picker bars.

A more specific object is to provide spring means incorporated in the drum and acting on the picker bars for confining them against severe whipping action, while enabling full pivotal action of the picker bars for their picking function.

Still another object is to provide means of the foregoing character which is of extremely simple construction and can be added to present cotton pickers.

Other objects and advantages of the invention will appear from the following detail description taken in conjunction with the accompanying drawings in which—

FIGURE 1 is a plan view, partially in section, of a conventional cotton picker;

FIGURE 2 is a view oriented according to line 2—2 of FIGURE 1 showing one picker bar and the control means of the present invention; and FIGURE 3 is a view taken at line 3—3 of FIGURE 2 and including a representation of the full complement of picker bars in the drum.

Referring now in detail to the accompanying drawing, attention is directed first to FIGURE 1 showing a conventional cotton picker of the type to which the present invention is applicable. A cotton picker is represented as a whole at 10 and may be of the type shown in U.S. Patent No. 2,140,631 issued Dec. 20, 1938, to Johnston. Such a cotton picker, as well as other cotton pickers of this same general type, includes one or more picker units 12. The picker, as oriented in FIGURE 1, travels to the right as indicated by the arrow 14 and is provided with a passageway 16 through which the cotton plants move rearwardly as indicated by the arrow 18. A picker drum 20 is provided on each side of the passageway 16, these picker drums being substantial duplicates, but symmetrical opposites. The following description refers to only one such drum, it being understood that the construction of the invention is incorporated in each of the drums.

Each drum includes a central shaft 22 by which the drum is mounted, the details of its mounting being eliminated in the present description, and further includes a bottom plate 24 and a top plate 26 fixed to the shaft and rotatable therewith.

Incorporated in the drums are a plurality of picker bars 28 also of conventional construction each having a plurality of spindles 30 in a vertical row extending laterally from the picker bar. The picker bar may for convenience include a central shaft 32 and an outer sleeve 34, the central shaft extending through the top plate 26 and having secured thereon a cam arm 36 provided with a cam follower 38.

The drum is mounted in the picker unit in association with cam means indicated in its entirety at 40 and including a cam slot or track 42 (FIGURE 1). This cam track is of predetermined shape, noncircular, and receives the cam followers 38. The picker bars 28 are distributed in a circle around the drum, there being 15 such bars in the present instance, and the cam track 42 is so shaped that as the picker bars approach the passage 16, the spindles are projected out into the passage and as the drum continues to rotate and carry the picker bars to the back side of the drum, the spindles are brought into association with a doffer 44. This construction is of known kind.

The means constituting the construction of the present invention and designated a control means for convenience, is indicated in its entirety at 46 and mounted on the central shaft 42 and having spring means engaging the picker bars 28. The assembly includes a central split ring or band 48 of substantial height or axial dimension encircling the central shaft 22 and having ears or lugs 50 for securing the parts together into a unitary ring and frictionally locking the ring on the shaft. Secured to the central ring at the upper and lower ends thereof are a pair of axially spaced outer split rings 52, being so secured by means of radial arms 54.

Secured to the outer rings 52 are a plurality of U-shape, flat tension springs 56, each having a web portion 58 secured to the outer ring as by means of a bolt 60 and spaced arms 62 extending generally radially outwardly and flanking a respective one of the picker bars. The springs 56 for the successive picker bars circumferentially in the drum are disposed alternately on the upper and lower outer rings to provide sufficient room for each spring and otherwise facilitate mounting the control means on the shaft 22. The web portions 58 of the springs are of substantial width whereby to produce a firm mounting relation of the springs on the outer ring 52, thus preventing lateral movement of the springs other than the yielding movement of the arms 62 themselves.

The arms 62 directly engage the respective picker bars, without any play or space therebetween, and serve to retain them in predetermined aligned position, modulating the whipping action of the bars about the sharp curves of the cam. The springs are of flexible material so that the arms thereof can yield to a limited extent, although they are of sufficient firmness and rigidity to effectively buff the whipping action and undue movements of the picker bars.

As indicated in FIGURE 2, the control assembly 46 is positioned adjacent the middle to the drum, vertically, for most effective control action, although it need not be exactly so positioned. The control assembly can be readily applied to present cotton pickers, it not being necessary to redesign the picker or any parts thereof, for so applying the device. The assembly is readily separated into two halves, each of which can easily be applied to the drum, fitting each half of the inner ring 48 to the shaft, and when the two parts are so fitted, the bolt means 51 are applied for securing the parts together in tight gripping relation to the shaft.

While I have herein disclosed a preferred form of the invention it will be understood that changes may be made therein within the spirit and scope of the appended claims.

I claim:

1. A cotton picker drum having a plurality of picker bars each having a crank arm and cam means cooperating with said crank arm for predisposing the attitude of said bars attendant to their orbital movement about a substantially vertical axis, and means for controlling lateral oscillations of said bars and including means for damping such lateral oscillations.

2. The invention according to claim 1 wherein the speed of rotation of the drum is so great as to cause whipping action of the picker bars in the absence of means to prevent it, said control means includes spring means engaging the picker bars and effectively modulating said whipping action but having limited flexibility and capable of yielding to an extent sufficient to allow desired movement of the picker bars.

3. The invention according to claim 2 wherein the drum includes a central axial core, the control means is mounted on said core and includes generally radially extending spring means operatively engaging the respective picker bars.

4. The invention according to claim 3 wherein the spring means include U-shape springs individual to the picker bars with radially outwardly extending arms flanking the picker bars.

5. The invention according to claim 4 wherein the control means includes split ring means forming a pair of opposed halves detachably mounted on said core, and the spring means are secured to said ring means.

6. The invention according to claim 5 wherein said ring means includes a pair of relatively vertically spaced rings, and the springs are distributed on each of the rings, those on each ring engaging alternate ones on the picker bars and staggered circumferentially relative to those on the other ring.

7. The invention according to claim 1 wherein the drum includes a central shaft and bottom and top end plates rotatable therewith, the picker bars being mounted in the end plates, and wherein the control means includes a ring assembly, the ring assembly including a split inner ring of substantial axial length having opposed halves and radially extending ears, the opposed halves being fitted to the central shaft with the ears in register, means detachably securing the halves together for frictionally retaining the assembly on the central shaft, the ring assembly also including upper and lower outer split rings each including opposed halves secured to the corresponding halves of the inner ring by means of radially extending arms spacing the outer and inner rings apart, the outer rings being disposed respectively above and below said ears on the inner ring, said assembly also including a plurality of U-shape springs each of flat spring steel and including a web portion and a pair of arms, the web portion being fitted to one of the outer rings and secured thereto against flexing movement, and the arms having limited flexibility and flanking one of the picker bars in contact engagement therewith, the springs on each outer ring being associated with alternate ones of the picker bars circumferentially of the drum, and those on the two rings being relatively staggered whereby the springs engaging adjacent ones of the picker bars are on different ones of the vertically spaced outer rings.

References Cited

UNITED STATES PATENTS

| | | | |
|---|---|---|---|
| 1,802,022 | 4/1931 | Johnston et al. | 56—14 |
| 2,140,631 | 12/1938 | Johnston | 56—43 |
| 2,691,265 | 10/1954 | Ferguson | 56—41 |
| 2,723,520 | 11/1955 | Hubbard | 56—47 |

RUSSELL R. KINSEY, *Primary Examiner.*

UNITED STATES PATENT OFFICE
CERTIFICATE OF CORRECTION

Patent No. 3,422,609 January 21, 1969

Emil J. Grichnik

It is certified that error appears in the above identified patent and that said Letters Patent are hereby corrected as shown below:

In the heading to the printed specification, lines 3 and 4, "903 N. McNeil St., Memphis, Tenn. 38107" should read -- Memphis, Tenn., assignor to International Harvester Company, Chicago, Ill., a corporation of Delaware --.

Signed and sealed this 31st day of March 1970.

(SEAL)
Attest:

Edward M. Fletcher, Jr.

Attesting Officer

WILLIAM E. SCHUYLER, JR.

Commissioner of Patents